J. F. CRAVEN.
RECEPTACLE FOR CONTAINING AND DISCHARGING SEMISOLID AND PASTY SUBSTANCES.
APPLICATION FILED OCT. 14, 1910.

993,512.

Patented May 30, 1911.

WITNESSES

INVENTOR

UNITED STATES PATENT OFFICE.

JAMES F. CRAVEN, OF PITTSBURG, PENNSYLVANIA.

RECEPTACLE FOR CONTAINING AND DISCHARGING SEMISOLID AND PASTY SUBSTANCES.

993,512. Specification of Letters Patent. Patented May 30, 1911.

Application filed October 14, 1910. Serial No. 587,087.

*To all whom it may concern:*

Be it known that I, JAMES F. CRAVEN, a resident of Pittsburg, in the county of Allegheny and State of Pennsylvania, have invented a new and useful Improvement in Receptacles for Containing and Discharging Semisolid and Pasty Substances, (Case 8,) of which the following is a specification.

This invention relates to receptacles for containing, storing, transporting and discharging semi-solid and pasty substances.

The device is intended more particularly for putting up lubricants in the form of grease and discharging the same into grease cups of machines, and the particular purpose is to enable the grease to be supplied to bearings without liability of dirt or grit entering the bearings with the grease, and also smearing up or soiling the machinery or hands of the user. The invention, however, is not limited to this particular use, but is adapted for putting up in a substantially sealed condition any semi-solid or pasty substance, such as vaseline, cold cream, and the like, or even butter or lard, and delivering the same from the container in any desired quantity or quantities.

The particular purpose of the present invention is to provide a device for the purpose specified so constructed that it automatically closes the outlet orifice when the operation of discharging the substance ceases.

The invention comprises the construction and arrangement of parts hereinafter described and claimed.

Figure 1:
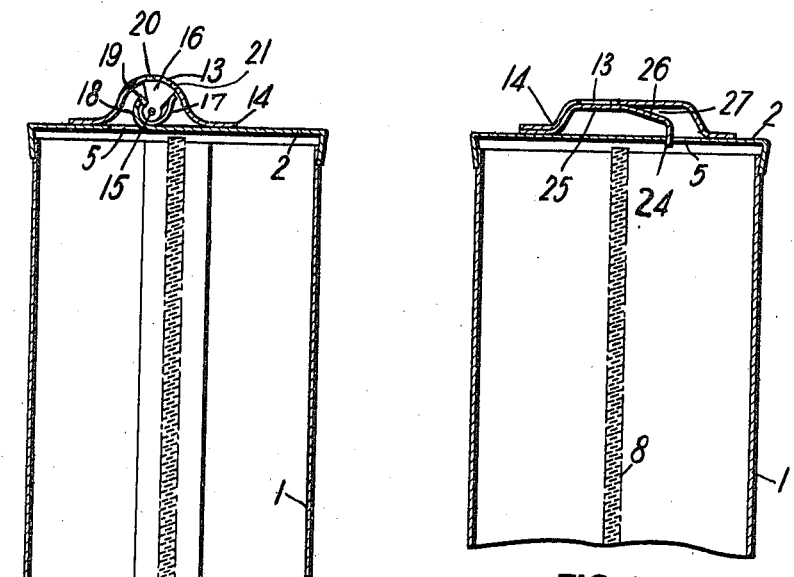
Figure 1:
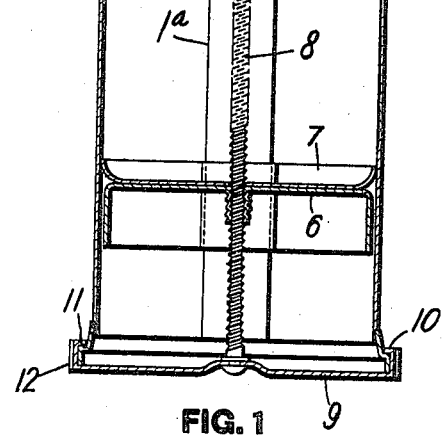
Figure 2:
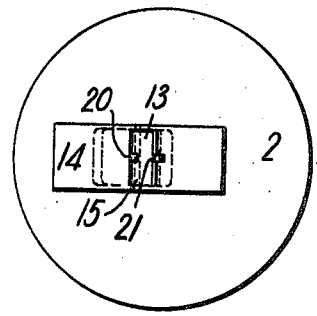

In the accompanying drawing Figure 1 is a vertical section through one form of the device showing the outlet orifice closed; Fig. 2 is a plan view of the same; and Fig. 3 is a vertical section showing a modification.

The receptacle itself may be of any desired shape or size, and may be constructed or built up in any desired way and from any desired material. As shown in the drawings the receptacle is formed as a substantially cylindrical tube 1 which may be of sheet metal or other thin substance and is shown as formed from paste or paper board. One end of this receptacle is closed by means of a head 2 which is shown crimped onto the tube 1. This can be done after the receptacle is filled, but if desired the head 2 can be secured to the tube 1 in any easily removable manner. This head is provided with the orifice 5 through which the material can be forced. The means shown for forcing the material through the receptacle comprises a piston or follower 6 provided with a cup leather 7 to form a tight fit in the receptacle and being longitudinally movable therein. Various devices may be used for moving the piston longitudinally, that shown comprising a threaded rod 8 arranged centrally of the receptacle and engaging a threaded opening in the piston or follower and at its outer end secured to a cap 9 which is rotatably but longitudinally immovable on the outer end of the tube 1, such as by turning its edge over a flange or shoulder 10 on the tube 1 or on a collar 11 crimped onto said tube. This cap is provided with a knurled or milled peripheral portion 12 by means of which it can be readily rotated. It serves not only as a means for rotating the screw 8, but also as a closure for the outer end of the receptacle. The piston 6 is prevented from rotating by means of a longitudinal inwardly projecting rib 1ª in the tube 1 which engages a groove in the piston. In the case of a paper tube such rib can be formed by means of a paste board strip pasted to the inner face of the tube. In case of a sheet metal tube the usual crimped seam forms such inward longitudinal rib.

Obviously when the cap 9 is rotated while the body 1 is held stationary the piston is caused to move toward the discharge orifice and forces the substance out of the latter.

The automatic means for opening and closing the discharge orifice comprises a suitable spring controlled valve. As shown in Figs. 1 and 2 the outlet orifice 13 is formed in a hood 14 which can be pressed outwardly from the head 2 but preferably is a separate piece soldered or otherwise secured to the head 2. The hood 14 is substantially semi-cylindrical in cross section, and mounted thereon upon a pin or other center 15 is a segment shaped valve 16, one edge of which is engaged by a spring 17 which normally holds the valve in the position shown in Fig. 1 to close the outlet orifice 13. When, however, the piston 6 is moved the pressure exerted on the material causes the latter to enter the space 18 in the hood 14 and act against the exposed face of valve 16, thereby rotating said valve on its center against the tension of spring 17 and forcing the valve backwardly so as to uncover the discharge orifice 13. The valve will remain open as long as the pressure on the material overcomes the force of spring 17. When the rotation of the screw 8 is stopped and the piston ceases to move the pressure of the material soon relieves itself through the outlet orifice, and the spring 17 then rotates valve 16 in the reverse direction and closes the outlet orifice. If desired, the cap 9 may be slightly rotated backwardly after the necessary amount of material has been discharged, to immediately relieve pressure and permit the spring 17 to close valve 16.

The rear face of the valve 16 is protected from the pressure of the material in the receptacle by the head 2, a portion 18 of which is turned up in front of the valve and prevents the material getting behind the valve. The spring 17 can be secured in any suitable way. As shown it is held between the valve and the cap 2 and endwise movement thereof is prevented by abutting against a lip 19 on the upturned part 18 of the head 2. To prevent the valve being pushed too far by spring 17, said valve is provided with a lug 20 projecting into the outlet orifice and adapted to contact with one edge wall thereof to stop the valve. The opposite edge wall of the orifice is provided with a slot 21 to receive said lug and permit the orifice to be opened to its full extent.

Fig. 3 illustrates a modification in which the valve is formed of a spring band 24 secured to the inner face of the hood 14 and having a straight or flat portion 25 covering the outlet orifice 13, and an inclined portion 26 leading down to the opening 5 through the head 2. In this case the hood 14 is preferably rectangular in cross section instead of semi-cylindrical, but in any event the spring 24 will be of a corresponding shape. In this case the flat portion 25 of the spring normally keeps the outlet orifice 13 closed, but the pressure of the material when the piston is actuated wedges into the triangular space 27 between the hood 14 and the inclined portion 26 of the spring, thereby causing said spring to move inwardly and open the discharge orifice 13. When the piston ceases to move the pressure relieves itself, thereby permitting the spring to move back to normal position and close the outlet orifice. Various other arrangements of spring valves will readily suggest themselves and by means of which the outlet orifice can be automatically opened when the piston exerts pressure on the substance in the receptacle and automatically closed when such pressure ceases.

The receptacle as a whole is substantially tightly sealed at all times so that the contents are shielded from dirt or from odors of other substances stored in the same vicinity. The contents can be readily discharged therefrom in any desired quantity and without danger of soiling the hands. The package has no projecting portions, so that it can be conveniently and safely packed, shipped and stored.

What I claim is:

1. A device of the character described comprising a receptacle provided at one end with a discharge orifice, means for exerting pressure on the substance to force it through said discharge orifice, and a valve normally closing the discharge orifice from the inside and arranged to be moved by the pressure of the substance to uncover such discharge orifice and to automatically close such orifice when the pressure ceases.

2. A device of the character described comprising a receptacle provided at one end with a discharge orifice, means for exerting pressure on the substance in the receptacle to force it through said orifice, and a spring valve normally closing said orifice from the inside and arranged to be moved by the pressure of the substance to uncover said orifice and to automatically close said orifice when the pressure ceases.

3. A device of the character described comprising a receptacle provided at one end with a discharge orifice, means for exerting pressure on the substance in the receptacle to force it through said orifice, a spring valve normally closing said orifice from the inside and arranged to have one face exposed to the pressure of the material, and means protecting the other face of the valve from said material.

4. A device of the character described comprising a receptacle provided at one end with a discharge orifice, means for exerting pressure on the substance in the receptacle to force it through said orifice, and an oscillatory spring valve normally closing said orifice from the inside and arranged to be moved by the pressure of the substance to uncover said orifice.

5. A device of the character described comprising a receptacle provided at one end with a discharge orifice, means for exerting pressure on the substance in the receptacle to force it through said orifice, and means independent of the pressure producing means and arranged to be moved by the pressure of the substance to uncover said orifice and to automatically close said orifice from the inside when pressure ceases.

6. A device of the character described comprising a receptacle provided at one end with a discharge orifice, a piston and actuating means arranged to exert pressure on the substance in the receptacle to force it through said orifice, and a valve independent of the piston and its actuating means and arranged to be moved by the pressure of the substance to uncover said orifice from the inside and to automatically close said orifice when pressure ceases.

In testimony whereof, I have hereunto set my hand.

JAMES F. CRAVEN.

Witnesses:
F. W. WINTER,
SUE B. FRITZ.